US012143858B2

(12) United States Patent
Xie et al.

(10) Patent No.: US 12,143,858 B2
(45) Date of Patent: Nov. 12, 2024

(54) METHOD AND APPARATUS TO SWITCH UPLINK TRANSMISSION ON UPLINK SPLIT BEARER

(71) Applicant: QUALCOMM Incorporated, San Diego, CA (US)

(72) Inventors: Ling Xie, Beijing (CN); Qingxin Chen, San Diego, CA (US); Reza Shahidi, San Diego, CA (US); Jun Hu, San Diego, CA (US); Sivaram Srivenkata Palakodety, San Diego, CA (US); Vishal Dalmiya, San Diego, CA (US); Wei-Jei Song, San Diego, CA (US); Arnaud Meylan, San Diego, CA (US); Zhibin Dang, San Diego, CA (US); Karthikeyan Sabapathi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/755,145

(22) PCT Filed: Nov. 25, 2019

(86) PCT No.: PCT/CN2019/120494
§ 371 (c)(1),
(2) Date: Apr. 21, 2022

(87) PCT Pub. No.: WO2021/102604
PCT Pub. Date: Jun. 3, 2021

(65) Prior Publication Data
US 2022/0386172 A1    Dec. 1, 2022

(51) Int. Cl.
*H04W 28/082*    (2023.01)
*H04W 28/02*    (2009.01)
*H04W 76/15*    (2018.01)

(52) U.S. Cl.
CPC ..... *H04W 28/082* (2023.05); *H04W 28/0278* (2013.01); *H04W 76/15* (2018.02)

(58) Field of Classification Search
None
See application file for complete search history.

(56) References Cited

U.S. PATENT DOCUMENTS 11,528,727 B2 *   12/2022   Jeon ..................... H04L 5/0044
2017/0079015 A1    3/2017   Takahashi et al.
(Continued)

FOREIGN PATENT DOCUMENTS

CN        1812313 A    8/2006
JP      2017028415 A    2/2017
(Continued)

OTHER PUBLICATIONS

International Search Report and Written Opinion—PCT/CN2019/120494—ISA/EPO—Jul. 28, 2020.
(Continued)

*Primary Examiner* — Anh Vu H Ly
(74) *Attorney, Agent, or Firm* — ArentFox Schiff LLP

(57) ABSTRACT

A user equipment (UE) configured for dual connectivity with a split bearer configuration may transmit uplink data packets to one or both a master cell group (MCG) and a secondary cell group (SCG). The UE may transmit an uplink transmission from a packet data convergence protocol (PDCP) entity over one or both of a first radio link control (RLC) entity associated with the MCG and a second RLC entity associated with the SCG. The configuration including a transmit buffer threshold. The UE may receive, at the PDCP entity, an uplink switch start indication. The UE may activate the second RLC entity in response to receiving the uplink switch start indication. The UE may transmit a buffer status report according to a current transmit buffer level plus
(Continued)

the transmit buffer threshold. Accordingly, the UE may communicate with the SCG based on the uplink switch start indication.

30 Claims, 12 Drawing Sheets

(56) References Cited

U.S. PATENT DOCUMENTS

| | | | |
|---|---|---|---|
| 2018/0084450 A1* | 3/2018 | Lee | H04W 24/02 |
| 2019/0098606 A1 | 3/2019 | Sharma et al. | |
| 2019/0098682 A1* | 3/2019 | Park | H04L 1/08 |
| 2020/0068437 A1* | 2/2020 | Lohr | H04W 28/065 |
| 2022/0117029 A1* | 4/2022 | Takada | H04W 52/0216 |

FOREIGN PATENT DOCUMENTS

| | | |
|---|---|---|
| WO | 2011152773 A1 | 12/2011 |
| WO | 2018222418 A1 | 12/2018 |

OTHER PUBLICATIONS

Supplementary European Search Report—EP19953774—Search Authority—Berlin—Jun. 26, 2023.

* cited by examiner

METHOD AND APPARATUS TO SWITCH UPLINK TRANSMISSION ON UPLINK SPLIT BEARER

CROSS REFERENCE TO RELATED APPLICATION(S)

This application is a National Phase entry of PCT Application No. PCT/CN2019/120494, entitled "METHOD AND APPARATUS TO SWITCH UPLINK TRANSMISSION ON UPLINK SPLIT BEARER" and filed on Nov. 25, 2019, which is expressly incorporated by reference herein in its entirety.

BACKGROUND

Technical Field

The present disclosure relates generally to communication systems, and more particularly, to a method and apparatus to switch uplink transmission on an uplink split bearer.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) configured for dual connectivity with a split bearer architecture may transmit uplink data packets to one or both a master cell group (MCG) and a secondary cell group (SCG). The MCG may become temporarily unavailable (e.g., due to a tune-away or poor channel conditions). Although the UE may transmit the uplink data packets to the SCG, transmitted data packets may also build up in a buffer for the MCG, leading to slower recovery when the MCG becomes available.

A user equipment (UE) configured for dual connectivity with a split bearer configuration may transmit uplink data packets to one or both of a master cell group (MCG) and a secondary cell group (SCG). The UE may transmit an uplink transmission from a packet data convergence protocol (PDCP) entity over one or both of a first radio link control (RLC) entity associated with the MCG and a second RLC entity associated with the SCG. The configuration including a transmit buffer threshold. The UE may receive, at the PDCP entity, an uplink switch start indication. The uplink switch start indication may indicate that the MCG may become temporarily unavailable or that use of the SCG is desirable. The UE may activate the second RLC entity in response to receiving the uplink switch start indication. The UE may transmit a buffer status report according to a current transmit buffer level plus the transmit buffer threshold. Accordingly, the UE may communicate with the SCG rather than the MCG based on the uplink switch start indication. The uplink data packets may not build up in the buffer for the MCG, so the radio link with the MCG may be restored without additional latency. In some cases, communication with the SCG may provide additional benefits such as greater bandwidth and lower latency.

In an aspect of the disclosure, a method, a computer-readable medium, and an apparatus are provided. The apparatus may include a memory and at least one processor coupled to the memory. The processor may be configured to transmit, from a user equipment, an uplink transmission using an uplink split bearer configuration from a packet data convergence protocol (PDCP) layer over one or both of a first radio link control (RLC) entity associated with a master cell group (MCG) and a second RLC entity associated with a secondary cell group (SCG), the configuration including a transmit buffer threshold. The processor may be configured to receive, at the PDCP entity, an uplink switch start indication. The processor may be configured to activate the second RLC entity in response to receiving the uplink switch start indication. The processor may be configured to transmit a buffer status report according to a current transmit buffer level plus the transmit buffer threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
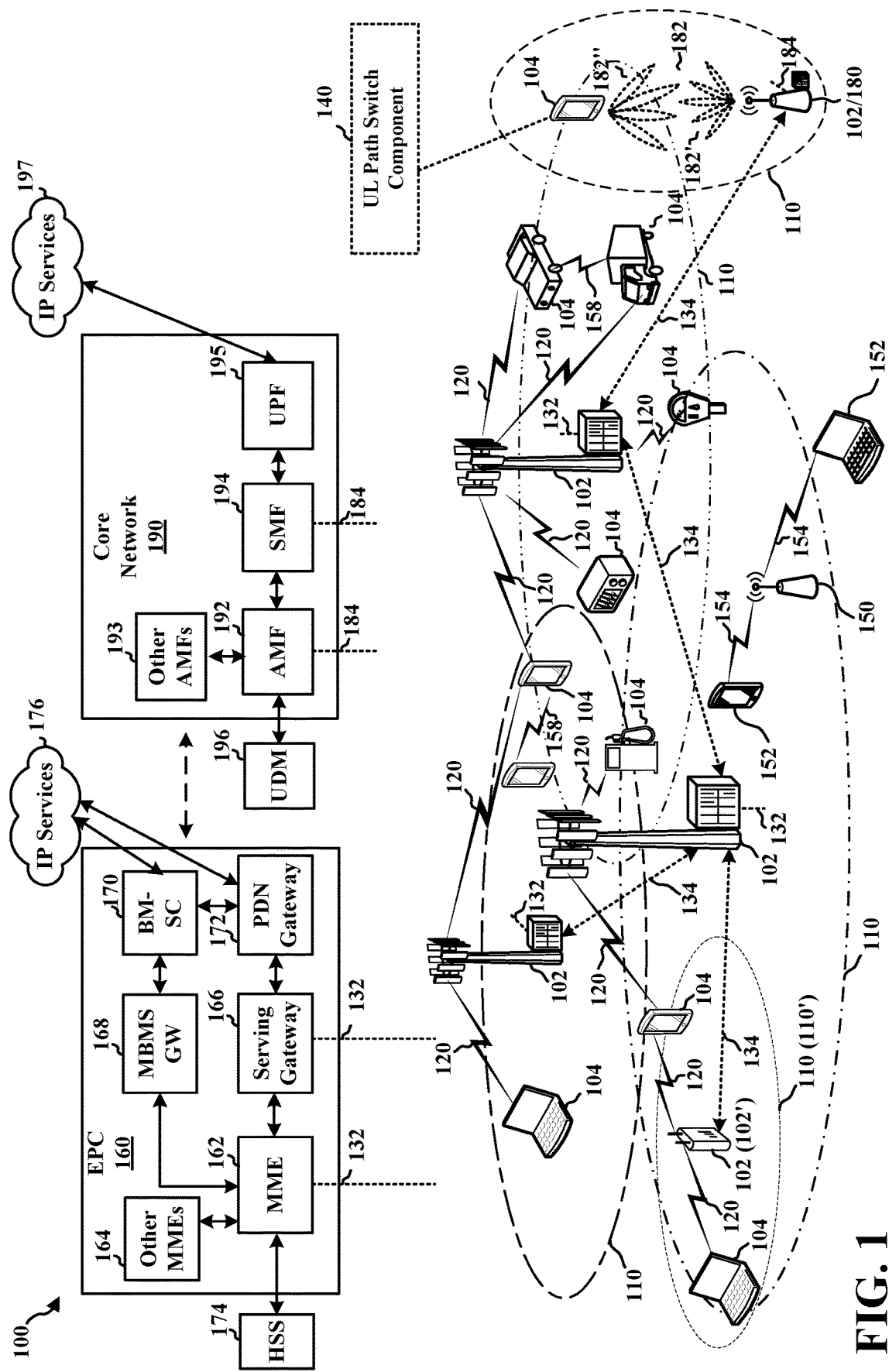
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an UL path switch component 140 configured to control activation of a second radio link control RLC entity in an UL split bearer configuration in response to an uplink split start/stop indication. For example, the UL path switch component 140 may transmit, from the UE 104, an uplink transmission using an uplink split bearer configuration from a packet data convergence protocol (PDCP) layer over one or both of a first radio link control (RLC) entity associated with a master cell group (MCG) and a second RLC entity associated with a secondary cell group (SCG). The uplink split bearer configuration may include a transmit buffer threshold. The UL path switch component 140 may receive, at the PDCP entity, the uplink switch start indication. The UL path switch component 140 may activate the second RLC entity in response to receiving the uplink switch start indication. The UL path switch component 140 may transmit a buffer status report according to a current transmit buffer level plus the transmit buffer threshold. Accordingly, the UL path switch component 140 may enable the UE 104 to use the second RLC entity instead of or in addition to the first RLC entity even when an uplink transmit buffer level does not satisfy the transmit buffer threshold. Doing so may reduce latency and/or improve uplink throughput.

Although the following description may be focused on 5G NR, the concepts described herein may be applicable to other similar areas, such as LTE, LTE-A, CDMA, GSM, and other wireless technologies.

Figure 2:
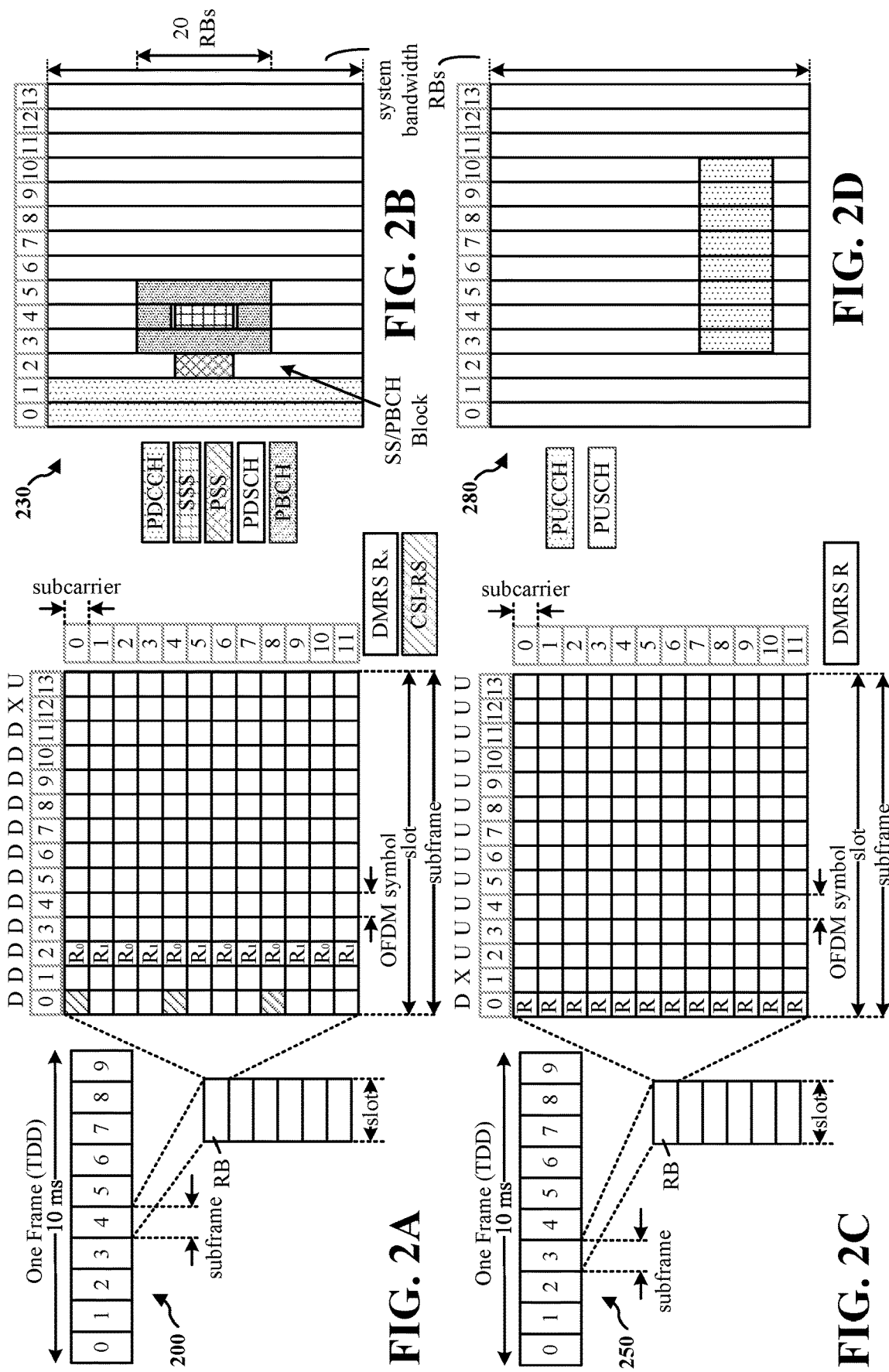
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RB s (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
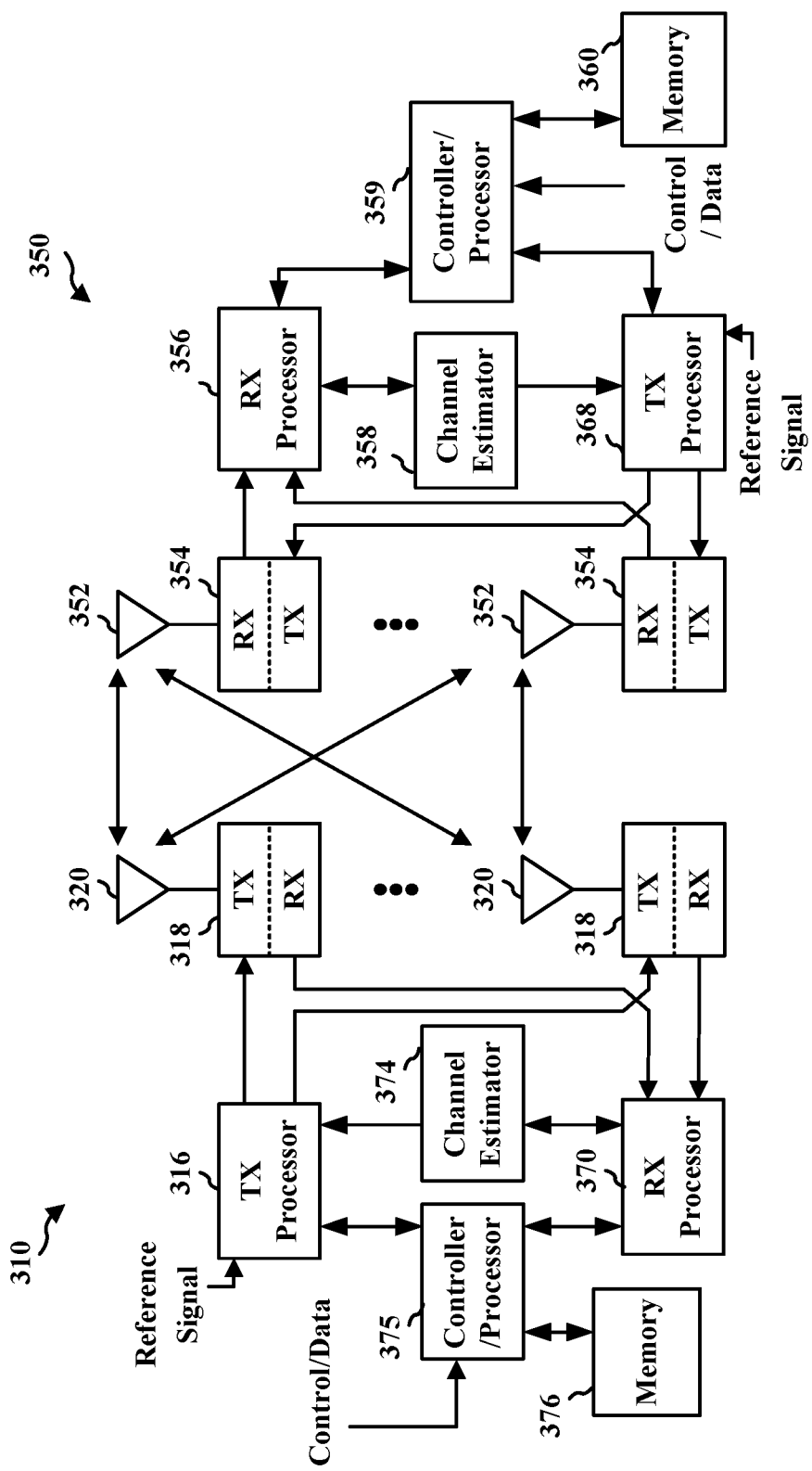
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UL path switch component 140 of FIG. 1.

Figure 4:
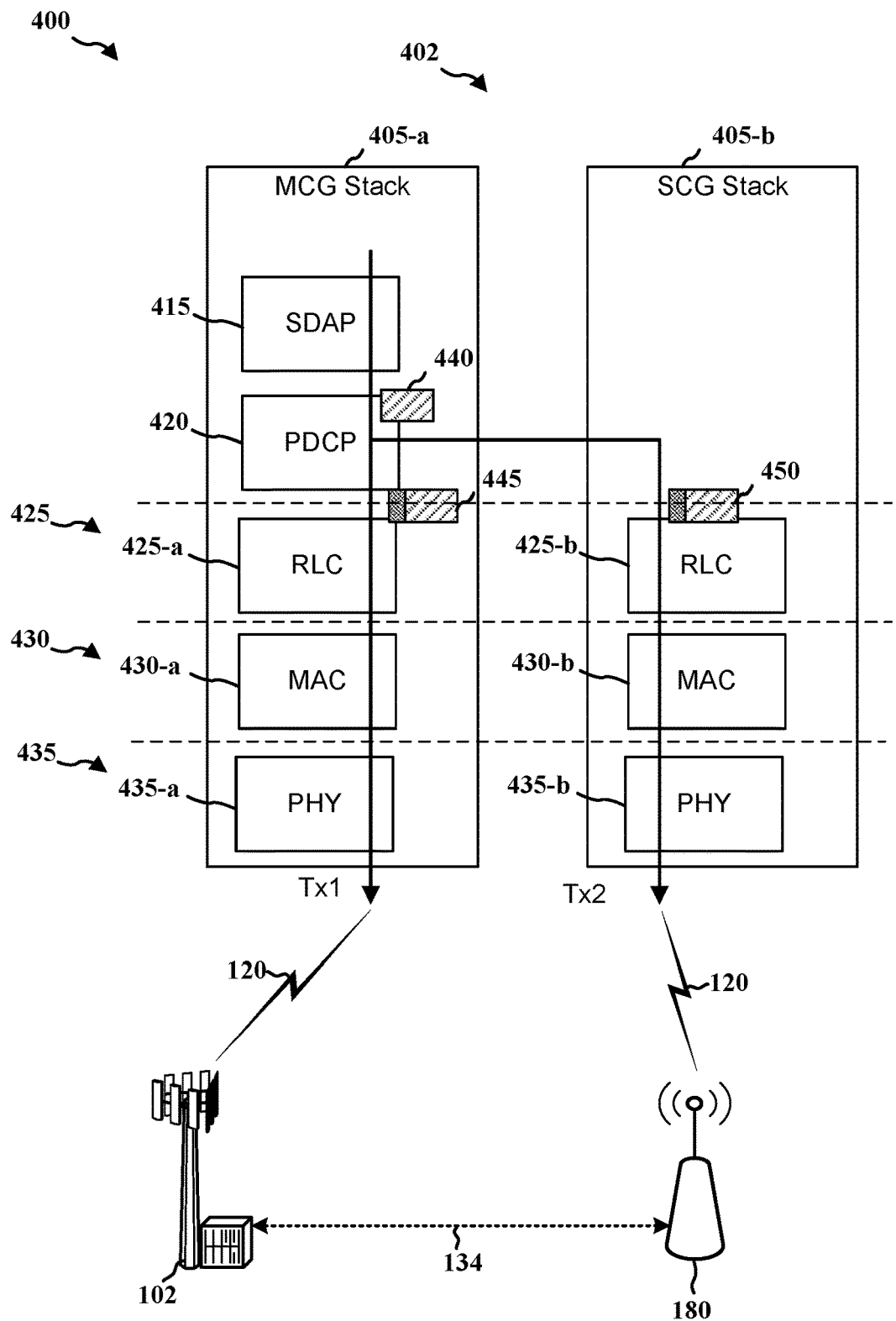
FIG. 4 is a diagram illustrating an example of a split bearer architecture for dual connectivity.

FIG. 4 illustrates an example of a protocol architecture 400 that supports a split bearer configuration 402 in accordance with aspects of the present disclosure. The protocol architecture 400 may include protocol stacks 405-a, 405-b, which may include multiple protocol entities that may be common to both user and control planes in protocol stacks 405-a, 405-b. In some examples, the protocol architecture 400 may implement aspects of wireless communications systems 100, as described with reference to FIG. 1. For example, the protocol architecture 400 may support dual-connectivity using split bearer. Further, the protocol architecture 400 may support packet duplication, and more particularly PDCP duplication. For example, with reference to FIG. 1, UE 104 may use a first protocol stack for packet transmission to one or more base stations associated with a MCG (MCG stack 405-b) and a second protocol stack for packet transmission to base stations associated with a SCG (SCG stack 405-b). For example, in an aspect that may be used for E-UTRAN New Radio-Dual Connectivity (EN-DC), the MCG may utilize a first radio access technology (RAT) (e.g., LTE) and the SCG may utilize a second RAT (e.g., 5G NR). For instance the MCG may include a base station 102 configured for 4G LTE, and the SCG may include a base station 180 configured for 5G NR. The protocol architecture 400 may therefore support dual connectivity based on a configuration for the UE 104 to experience reduced power consumption, improved reliability for packet transmissions, increased spectral efficiency, higher data rates and, in some examples, low latency for wireless communications, among other benefits.

Protocol stack 405-a may include a service data adaptation protocol (SDAP) layer 415, a PDCP entity 420, a radio link control (RLC) layer 425, a medium access control (MAC) layer 430, and a physical (PHY) layer 435. Each layer may be implemented by one or more entities. For example, the RLC layer 425 may include the RLC entity 425-a. Protocol stack 405-b may include a subset of the protocol layers and entities as the MCG stack 405-a. For example, protocol stack 405-b may also include an RLC entity 425-b at the RLC layer 425, a MAC entity 430-b at the MAC layer 430, and a PHY entity 435-b at the PHY layer 435. As explained in further detail below, the SCG stack 405-b may share the SDAP layer 415 and the PDCP entity 420 of the MCG stack 405-a. The multiple protocol entities may be in communication with one another via one or more radio bearers, logical channels, transport channels. For example, SDAP layer 415 and PDCP entity 420 may be in communication with RLC layer 425 via one or more radio bearers, RLC layer 425 may be in communication with MAC layer 430 via one or more logical channels, and MAC layer 430 may be in communication with PHY layer 435 via one or more transport channels. Radio bearers may include signaling radio bearers (SRB), such as SRB0, SRB1, SRB2, SRB3, etc. Examples of logical channels include broadcast control channel (BCCH), paging control channel (PCCH), common control channel (CCCHH), dedicated control channel (DCCH), dedicated traffic channel (DTCH), multicast traffic channel (MCH), or multicast control channel (MCCH). Examples of transport channels include uplink shared channel (UL-SCH), downlink shared channel (DL-SCH), paging channel (PCH), broadcast channel (BCH), rand access channel (RACH).

SDAP layer 415 may support and perform various functions, for example, mapping between a quality-of-service (QoS) flow and a data radio bearer, as well as assign QoS flow identifiers to uplink packets. In some examples, SDAP layer 415 may receive uplink packet 440 and may assign uplink packet 440 to a QoS flow and a set of radio bearers to ensure that uplink packet 440 receives the correct forwarding treatment as it traverses the protocol stacks 405-a, 405-b. For example, SDAP layer 415 may forward uplink packet 440 to PDCP entity 420 according to the assigned QoS flow and the set of radio bearers. Uplink packet 440 may be a PDCP service data unit (SDU).

PDCP entity 420 may support and perform various PDCP layer functions, such as transfer of user data, header compression, sequence numbering, duplication detection, packet duplication, and the like. In some examples, PDCP entity 420 may receive an uplink packet 440 (e.g., PDCP SDU) and may perform header compression followed by ciphering. In some examples, PDCP entity 420 may add a PDCP header carrying information for deciphering uplink packet 440. The PDCP entity 420 may route different uplink packets 445, 450 to different RLC entities within an RLC layer 425. In an example split bearer configuration, the PDCP entity 420 may route uplink packets 445, 450 to only a primary RLC entity (e.g., RLC entity 425-a) unless a level of data satisfies a transmit buffer threshold, which may also be referred to an uplink data split threshold or ul-DataSplitThreshold. If the level of data satisfies the transmit buffer threshold, the PDCP entity 420 may route uplink packets to either the primary RLC entity or the secondary RLC entity (e.g., RLC entity 425-b). In the example of packet duplication, PDCP entity 420 may perform packet duplication on uplink packet 440 (e.g., PDCP PDU), also referred to as "PDCP duplication." As a result, PDCP entity 420 may generate uplink packets 445, 450 that may be entirely or partially equivalent (e.g., difference in radio bearer identifiers, logical channel identifiers). For example, uplink packet 445 may be associated with a radio bearer and logical channel different from uplink packet 450. In some examples, PDCP entity 420 performs packet duplication on uplink packet 440 based on an uplink packet duplication configuration, which may be an uplink PDCP duplication configuration. In some examples, PDCP entity 420 may perform packet duplication to generate a number of copies of uplink packet 440.

The RLC layer 425 may include a primary RLC entity 425-a that is associated with a MCG and a secondary RLC entity 425-b that is associated with an SCG. In an implementation, the PDCP entity 420 may route an uplink packet to only the primary RLC entity 425-a when the level of uplink traffic is below a transmit buffer threshold, but may route an uplink packet to either the primary RLC entity 425-a or the secondary RLC entity 425-b when the level of uplink traffic is at or above the transmit buffer threshold. For example, PDCP entity 420 may forward uplink packet 445 to RLC entity 425-a in protocol stack 405-a and forward uplink packet 450 to RLC entity 425-b in protocol stack 405-b. The use of two RLC entities may allow higher uplink data rates using dual connectivity. A base station 102 may configure the RLC entities 425-a, 425-b and the uplink buffer threshold. In some examples, each RLC layer 425 may have one or more logical channel associated with one or more serving cells or carriers via a logical channel mapping criteria. Each RLC layer 425 may assemble uplink packets 445, 450 (e.g., RLC SDUs) received from a corresponding PDCP entity 420 into further groups of one or more packets (e.g., RLC PDUs), and may pass the groups of packets to a corresponding MAC layer 430.

The MAC layer 430 may perform logical channel prioritization, and may assemble the groups of one or more packets (e.g., MAC SDUs) received from the RLC layers 425 into MAC PDUs (i.e., transport blocks (TBs)) that are passed to a lower layer (e.g., PHY layer 435) for transmission over a wireless interface. In the split bearer configuration, the MAC layer 430 may include a first MAC entity 430-a and a second MAC entity 430-b corresponding to the first RLC entity 425-a and the second RLC entity 425-b, respectively. Similarly, the PHY layer 435 may include a first PHY entity 435-a and a second PHY entity 435-b corresponding to the first RLC entity 425-a and the second RLC entity 425-b, respectively. For example, uplink packets 445, 450 may be transmitted in parallel across multiple carriers (e.g., via carrier aggregation) or over multiple base stations 102 that each may or may not use carrier aggregation. In some examples, additionally or alternatively, uplink packets 445, 450 may be transmitted in parallel across multiple carriers on a directional beam. Protocol architecture 400 may therefore support PDCP duplication with dual-connectivity using split bearer.

Figure 5:
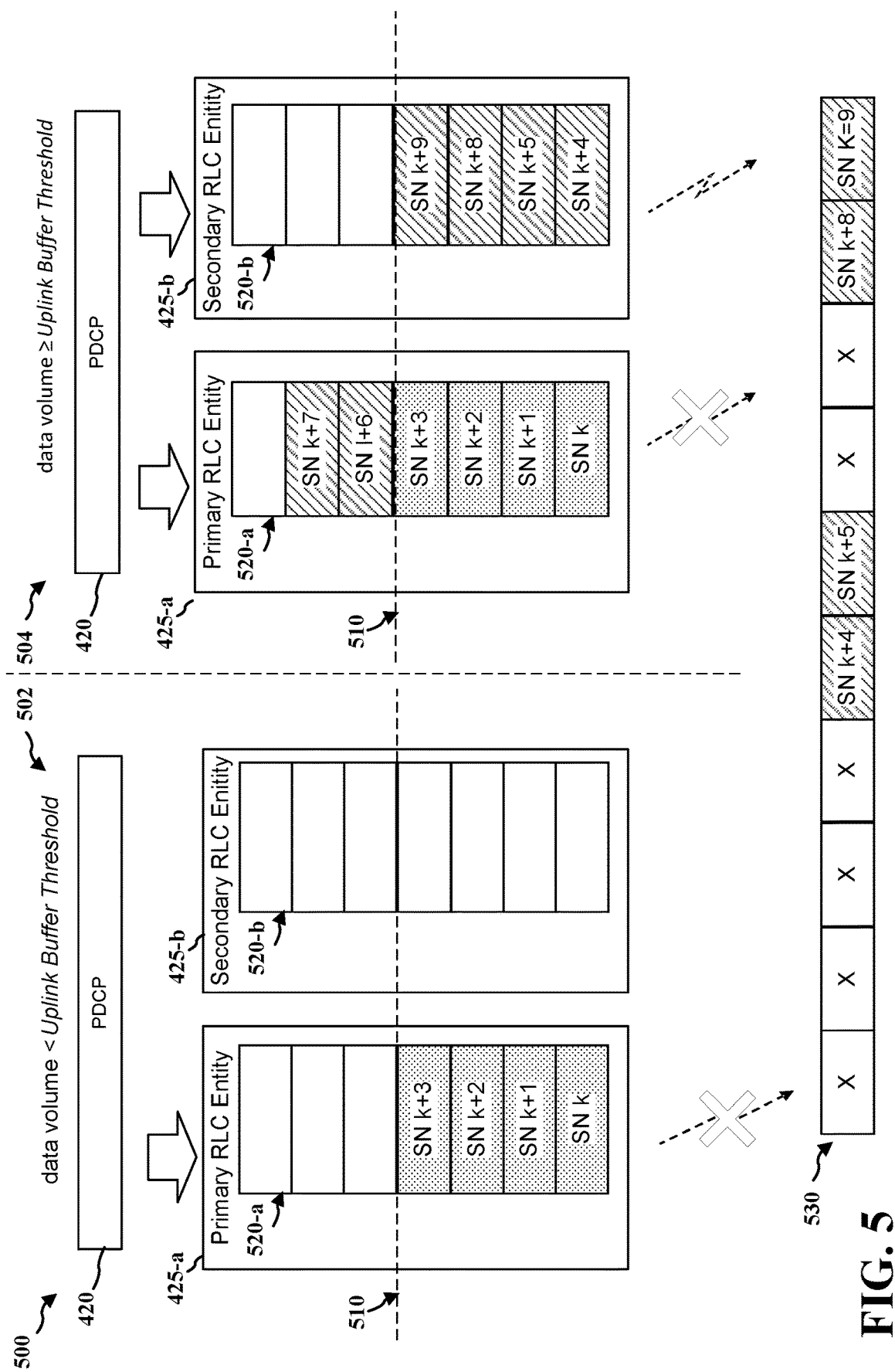
FIG. 5 is a diagram illustrating example transmissions using the split bearer architecture for dual connectivity when a transmission path becomes unavailable.

FIG. 5 is a diagram 500 of an example transmissions using the protocol architecture 400 and split bearer configuration 402. As discussed with respect to FIG. 4, the PDCP entity 420 may route PDCP PDUs to the primary RLC entity 425-a and/or the secondary RLC entity 425-b. Each RLC entity may include a respective transmit buffer 520-a that stores RLC PDUs for transmission. A total transmit buffer level may be the total of the individual transmit buffer levels. At a first time 502, the primary RLC entity 425-a may include 4 RLC PDUs with serial number (SN) k–k+3. In this example, total transmit buffer level (e.g., 4 RLC PDUs) may be less than the transmit buffer threshold 510. Accordingly, the PDCP entity 420 may route all of the uplink packets to the primary RLC entity 425-a.

In an aspect, the primary RLC entity 425-a may experience an issue such as a tune-away for a second SIM. Accordingly, the MAC entity 430-a and the PHY entity 435-a associated with the RLC entity 425-a may be temporarily unavailable and the RLC PDUs in the buffer 520-a may not be transmitted. As the number of RLC PDUs reaches the transmit buffer threshold 510, the PDCP entity 420 may route some RLC PDUs to the secondary RLC entity 425-b while also routing some RLC PDUs to the primary RLC entity 425-a. Accordingly, at a second time 504 when a data volume is greater than or equal to the transmit buffer threshold 510, the buffer 520-a may include the 4 untransmitted RLC PDUs with SN k–k+3 as well as new PDUs with SN k+6 and k+7. The connection for the secondary RLC entity 425-b may not experience the same issue and the MAC entity 430-b and PHY entity 435-b may be able to transmit the RLC PDUs in the buffer 520-b. Accordingly, a receive buffer 530 at the receiving device (e.g., base station 180) may receive RLC PDUs with SNs k+4, k+5, k+8, and k+9. As illustrated, these PDUs may be received out of order. Accordingly, the receiving device may report the missing RLC PDUs and wait for an RLC retransmission before performing RLC reordering.

Figure 6:
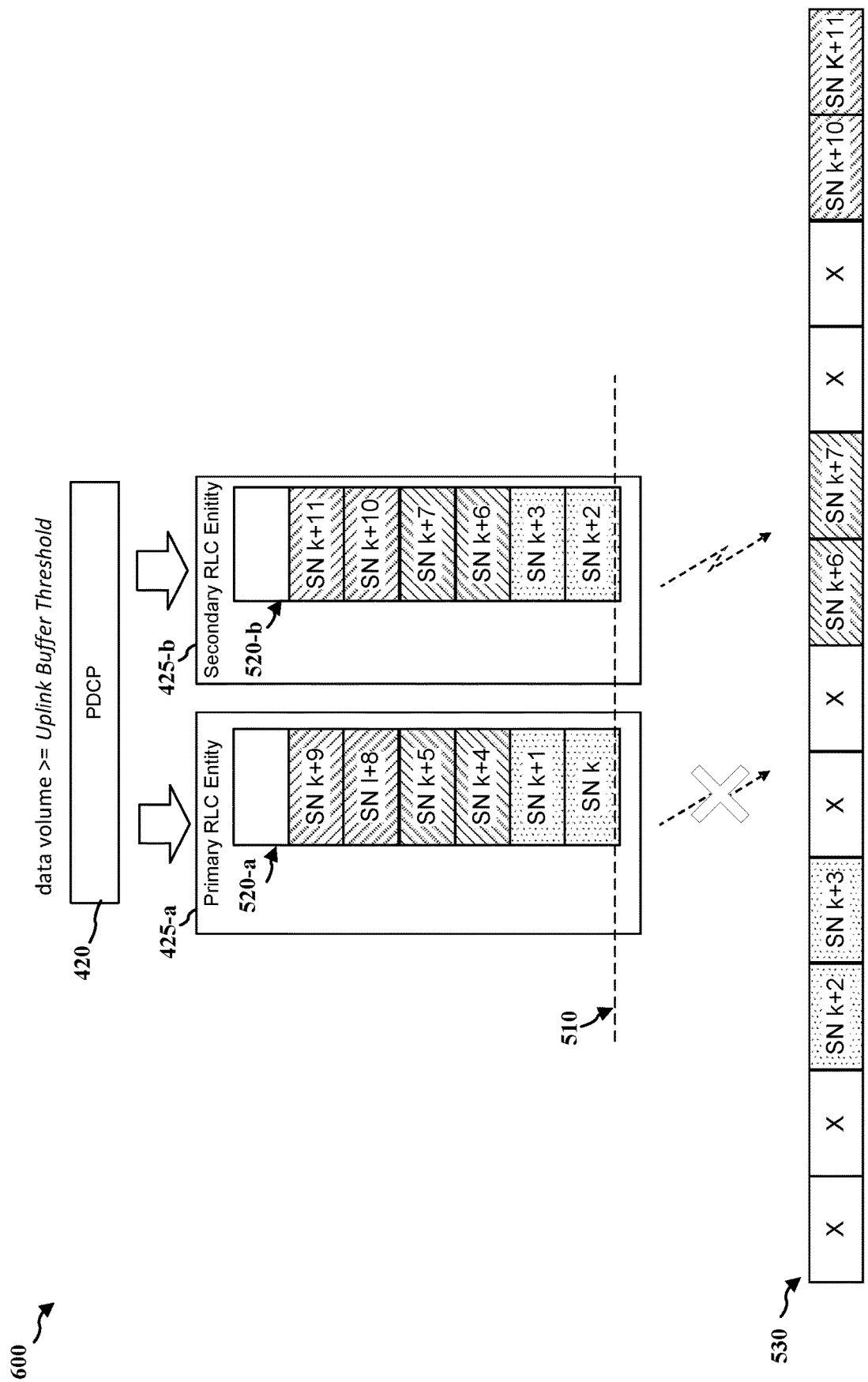
FIG. 6. is a diagram illustrating example transmissions using the split bearer architecture for dual connectivity when a transmission path becomes unavailable and a data volume is greater than a uplink buffer threshold.

FIG. 6 is a diagram 600 of example transmissions using the protocol architecture 400 and split bearer configuration 402. In this example, the transmit buffer threshold may be relatively low such that the PDCP entity 420 routes packets via both the primary RLC entity 425-a and the secondary RLC entity 425-b. For example, the PDCP entity 420 may alternate RLC entities every two PDUs. In an aspect, the primary RLC entity 425-a (illustrated) or the secondary RLC entity 425-b may experience an issue such as a tune-away for a second SIM. The other RLC entity (e.g., RLC entity 425-b) may continue to transmit RLC PDUs. Accordingly, a receive buffer 530 at the receiving device (e.g., base station 180) may receive RLC PDUs with SNs k+2, k+3, k+6, k+7, k+10 and k+11. As illustrated, these PDUs may be received out of order. Accordingly, the receiving device may report the missing RLC PDUs and wait for an RLC retransmission before performing RLC reordering.

Figure 7:
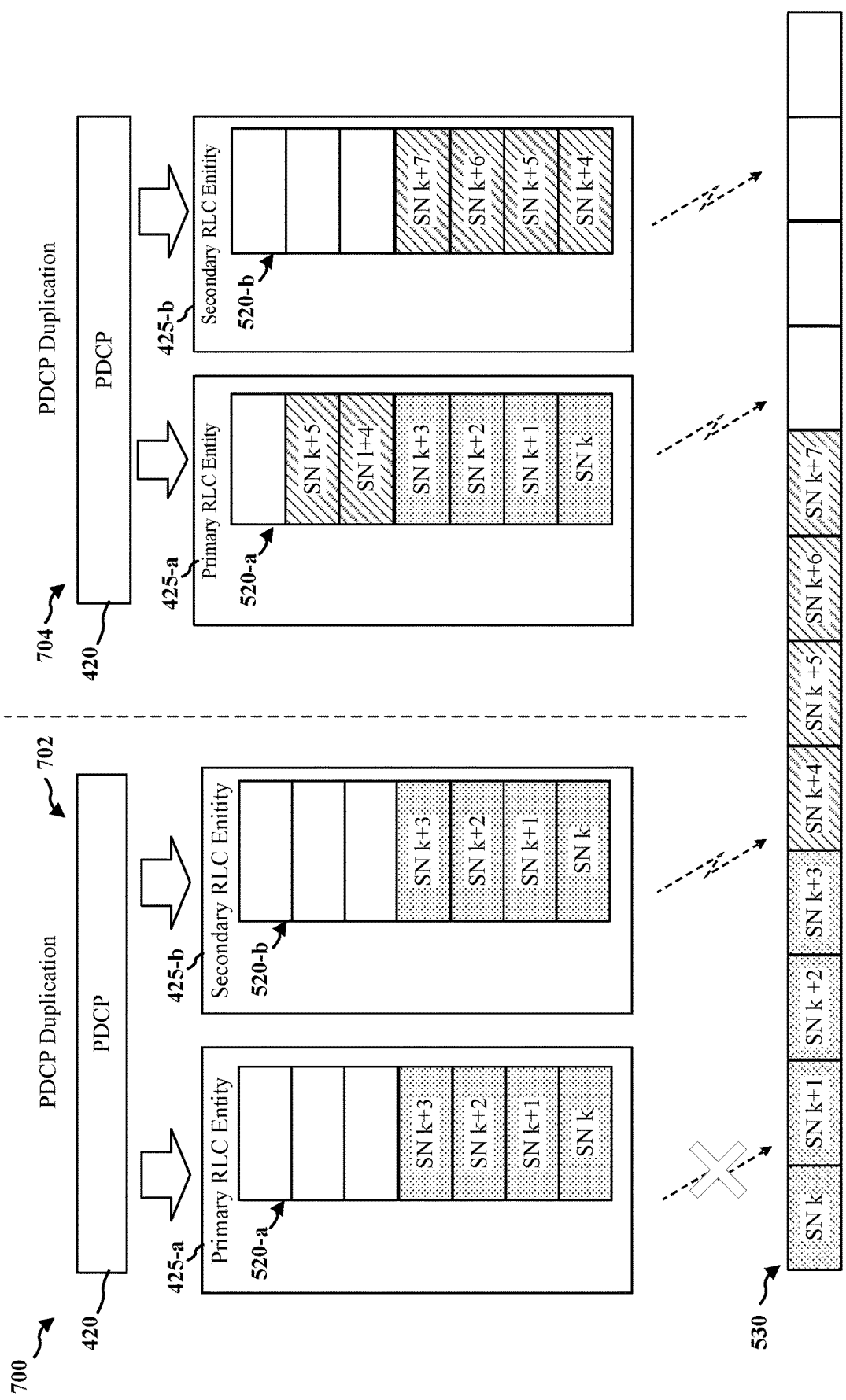
FIG. 7 is a diagram illustrating example transmissions using the split bearer architecture for dual connectivity with PDCP duplication when a transmission path becomes unavailable.

FIG. 7 is a diagram 700 of example transmissions using the protocol architecture 400 and split bearer configuration 402 with PDCP duplication. That is, the PDCP entity 420 may duplicate uplink packets and route a copy of each packet through both the primary RLC entity 425-a and the secondary RLC entity 425-b. In an aspect, the primary RLC entity 425-a (illustrated) or the secondary RLC entity 425-b may experience an issue such as a tune-away for a second SIM at a first time 702. The other RLC entity (e.g., RLC entity 425-b) may continue to transmit RLC PDUs. Accordingly, a receive buffer 530 at the receiving device (e.g., base station 180) may receive RLC PDUs with SN k–SN k–7 in order. Accordingly, PDCP duplication helps reduce latency in the event of a temporary event such as a tune-away. Once the primary RLC entity 425-*a* returns from the tune-away at time 704, however, the buffer 520-*a* may still include the overdue PDUs that have already been transmitted via the secondary RLC entity and received at the receive buffer 530. Accordingly, PDCP duplication may be less effective after recovery of the primary RLC entity 425-*a* until the primary RLC entity 425-*a* clears the buffer 520-*a*. That is, although the PDCP entity 420 duplicates the uplink packets, the receive buffer 530 may generally receive the PDUs from the secondary RLC entity 425-*b* first because of the longer queue at the primary RLC entity 425-*a*.

Figure 8:
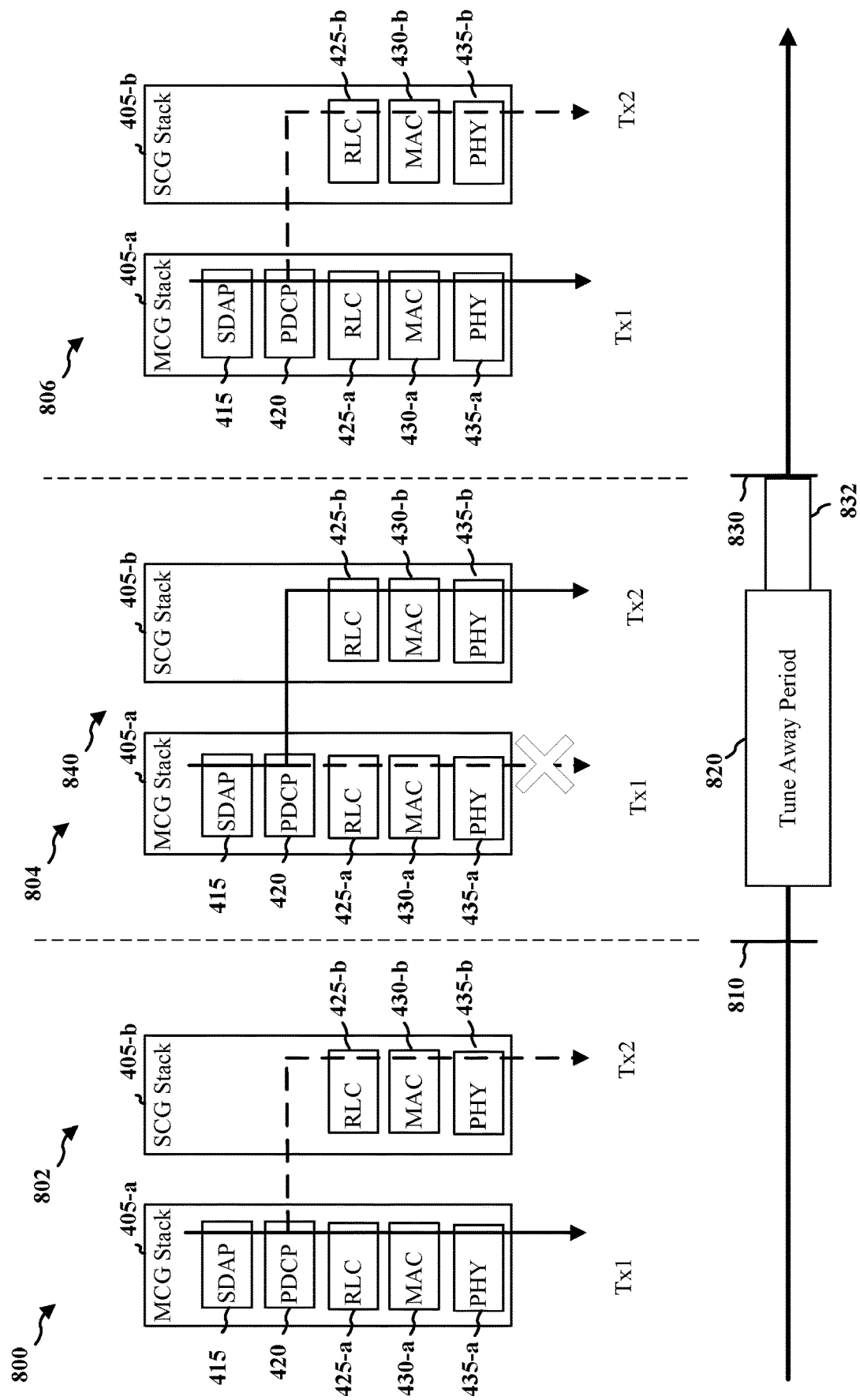
FIG. 8 is a diagram illustrating an example of uplink path switching for a split bearer architecture.

FIG. 8 is a diagram 800 illustrating an example of split bearer architecture with UL path switching. During a first time period 802, the UE 104 may operate with the protocol architecture 400 and split bearer configuration. That is, the UE 104 may transmit via the MCG stack 405-*a* unless the uplink buffer level satisfies the transmit buffer threshold, when the UE 104 may transmit via both the MCG stack 405-*a* and the SCG stack 405-*b*. The PDCP entity 420 may receive an uplink switch start indication 810. For example, the uplink switch start indication 810 may be an indication from a lower layer (e.g. RLC entity 425-*a*, MAC entity 430-*a*, or PHY entity 435-*a*) that radio-frequency resources are to be used for a tune-away. Accordingly, the RLC entity 425-*a* may be temporarily unable to transmit packets. Other events may also generate a switch start indication 810. For example, a switch start indication 810 may be generated by the lower layers based on an indication of poor channel conditions. For instance, the poor channel conditions may include a number of retransmissions that exceeds a threshold or a block error rate (BLER) that exceeds a threshold. As another example, the switch start indication 810 may be generated by a higher layer (e.g., SDAP layer 415) in response to an indication of low latency traffic (e.g., configuration of a QoS flow with low latency requirement).

In an aspect, in response to the switch start indication 810, during a second time period 804, the PDCP entity 420 may enter a switched mode 840 where the PDCP entity 420 may route uplink packets to the RLC entity 425-*b* instead of the RLC entity 425-*a*. The PDCP entity 420 may route uplink packets to the RLC entity 425-*b* regardless of an uplink buffer level. The SCG stack 405-*b* may require an uplink grant to transmit to the SCG. Due to the split bearer configuration, the network may only provide a grant for the SCG stack 405-*b* when the uplink buffer level satisfies the transmit buffer threshold. In order to obtain a grant for transmitting the uplink packets from the SCG stack 405-*b*, the SCG stack 405-*b* (e.g., MAC entity 430-*b*) may transmit a buffer status report according to a current transmit buffer level plus the transmit buffer threshold. Accordingly, the UE 104 may receive a grant for transmission to the SCG to transmit the RLC PDUs routed by the PDCP entity 420. During, for example, a tune away period 820, the lower layers for the MCG stack 405-*a* may be unavailable. The PDCP entity 420, however, may route all of the uplink packets to the RLC entity 425-*b* for transmission to the SCG. Accordingly, uplink communications may continue uninterrupted. In an aspect, when in the switched mode, the PDCP entity 420 may not route packets to the primary RLC entity 425-*a*. Accordingly, the buffer 520-*a* may not fill up with RLC PDUs while the lower layers are unavailable.

The PDCP entity 420 may receive a switch stop indication 830 indicating that the condition that triggered the switch start indication 810 has finished. For example, the switch stop indication 830 may be provided by the MAC entity 430-*a* after the tune away period 820 ends. In an aspect, the switch stop indication 830 may occur after a protection time period 832. The protection time period 832 may be based on a scheduling request configuration of the UE 104. For example, the protection time period 832 may provide sufficient time for the SCG stack 405-*b* to transmit a scheduling request and buffer status report in order to obtain a grant for transmitting any RLC PDUs in the buffer 530-*b*.

After the switch stop indication 830, during time period 806, the protocol architecture 400 may return to the normal mode of operation in which the PDCP entity 420 routes uplink packets to the primary RLC entity 425-*a* unless the current transmit buffer level satisfies the transmit buffer threshold.

Figure 9:
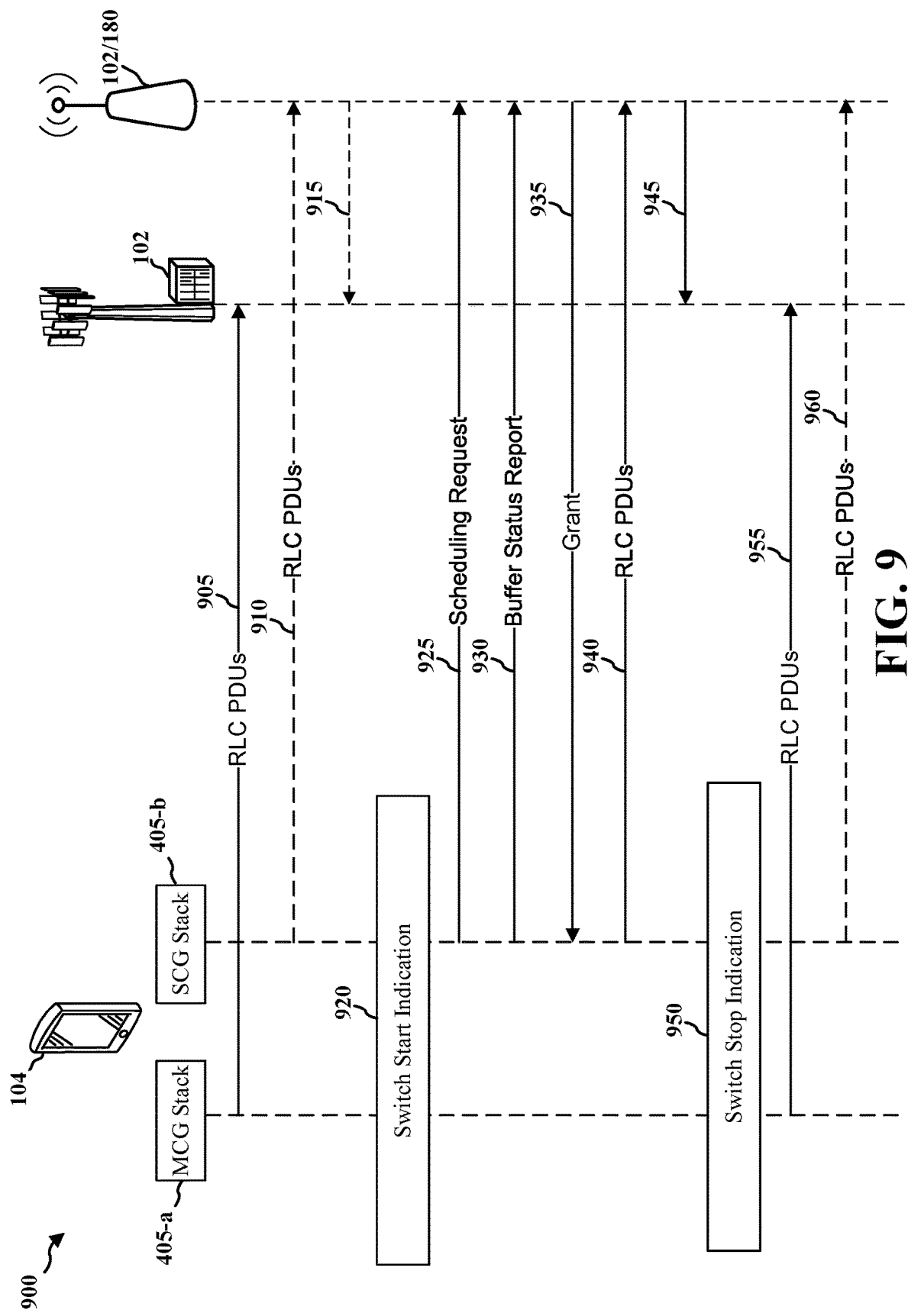
FIG. 9 is a message diagram illustrating example transmissions and processing for uplink path switching.

FIG. 9 is a message diagram 900 illustrating messages for split bearer communication with uplink path switching. The UE 104 may be configured with a split bearer configuration with the base station 102 as a primary cell of the MCG and the base station 180 as the primary cell of the SCG. In an aspect, the base station 102 may be for a first radio access technology (RAT) and the base station 180 may be for a second RAT. For example, the base station 102 may be an LTE base station and the base station 180 may be a 5G NR base station. The base station 102 and the base station 180 may communicate via the backhaul link 134. For example, the base station 180 may forward received uplink packets to the base station 102. As discussed above with respect to FIG. 4, the UE 104 may include a MCG stack 405-*a* and an SCG stack 405-*b* for communicating according to the respective RAT.

In the normal mode with the split bearer configuration, the UE 104 may transmit RLC PDUs 905 to the base station 102 via the MCG stack 405-*a*. If the transmit buffer level satisfies the transmit buffer threshold, the UE 104 may optionally transmit RLC PDUs 910 to the base station 180 via the SCG stack 405-*b*. At 915, the base station 180 may forward the PDUs 910 to the base station 102.

The UE 104 may detect a switch start indication 920. The switch start indication 920 may correspond to the switch start indication 810. The switch start indication 920 may be an indication to the PDCP entity 420 to enter the switched mode. In response to the switch start indication, in the switched mode, the PDCP entity 420 may route uplink packets (e.g., PDCP PDUs or RLC SDUs) to one or more RLC entities 425-*b* of the SCG stack 405-*b*. In the switched mode, the UE 104 may transmit a scheduling request (SR) 925 to the base station 180 via the SCG stack 405-*b* (e.g., the PHY entity 435-*b*). The UE 104 may transmit a buffer status report (BSR) 930 to the base station 180 via the SCG stack 405-*b* (e.g., the MAC entity 430-*b*). The BSR 930 may indicate a transmit buffer level based on the current transmit buffer level plus the transmit buffer threshold. Accordingly, based on the BSR 930, the base station 180 and/or the base station 102 may determine that the UE 104 has uplink traffic for the SCG. The base station 180 may transmit a grant 935 indicating resources for the UE 104 to use for transmissions for the SCG. For instance, the grant 935 may be a downlink control information (DCI) or a configured grant (CG). The UE 104 may transmit RLC PDUs 940 to the base station 180 via the SCG stack 405-*b* according to the grant 935. At 945, the base station 180 may forward the received RLC PDUs 940 to the base station 102, which may include the RLC entity for the network.

The UE 104 may detect a switch stop indication 950. The switch stop indication 950 may correspond to the switch stop indication 830. For example, the switch stop indication 950 may be generated after an event such as the tune away period 820 ends. The switch stop indication 950 may be generated after the protection time period 832 to allow the SCG stack 405-b to obtain grants and transmit RLC PDUs in the transmit buffer before returning to normal mode. In response to the switch stop indication 950, the UE 104 may return to the normal mode where the UE 104 may transmit RLC PDUs 955 via the MCG stack 405-a, and optionally transmit RLC PDUs 960 via the SCG stack 405-b when the transmit buffer threshold is satisfied.

Figure 10:
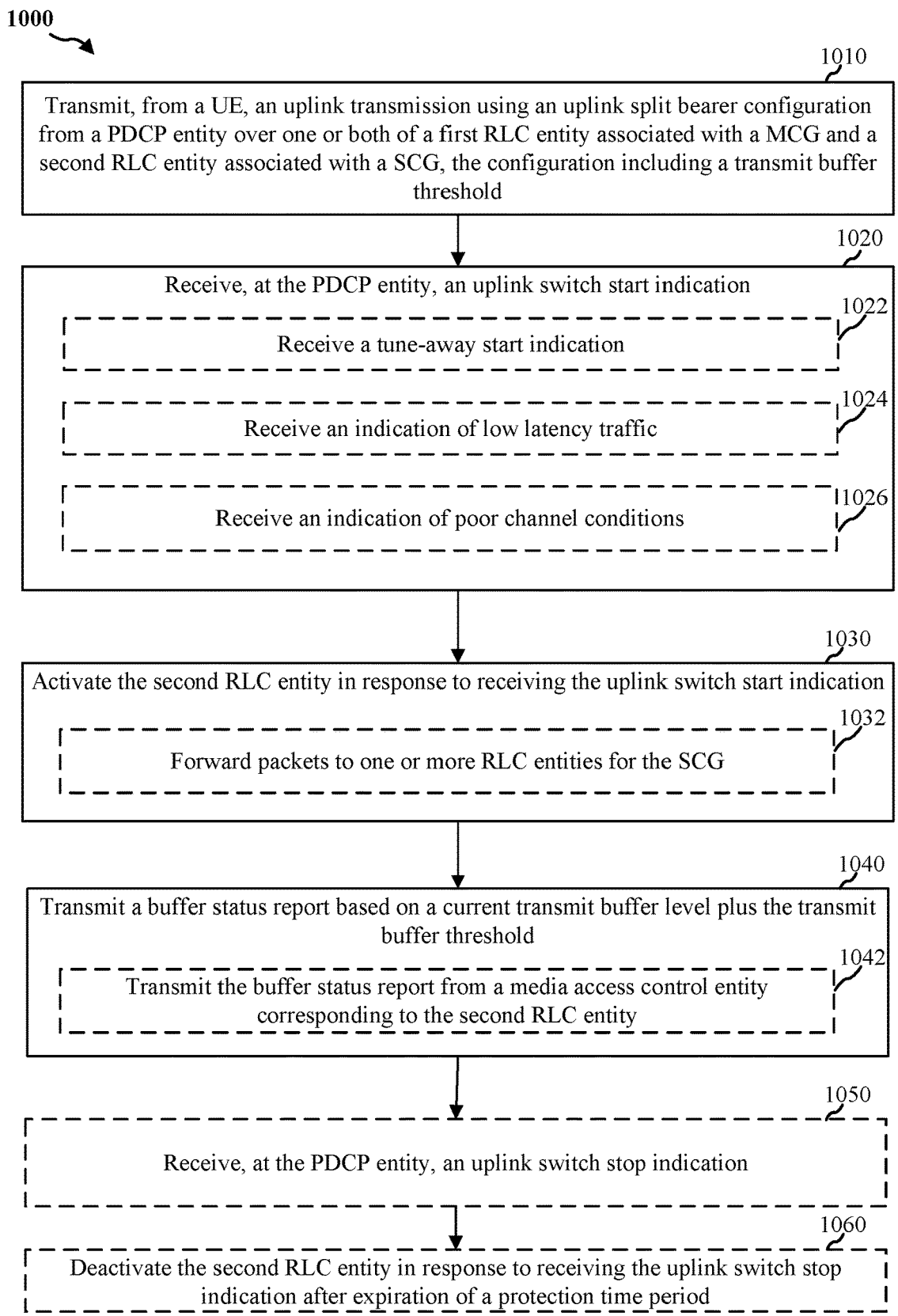
FIG. 10 is a flowchart of a method of wireless communication.

FIG. 10 is a flowchart of a method 1000 of wireless communication. The method 1000 may be performed by a UE or a component of a UE (e.g., the UE 104; the apparatus 1102/1102'; the processing system 1214, which may include the memory 360 and which may be the entire UE 350 or a component of the UE 350 such as the TX processor 368, the RX processor 356, and/or the controller/processor 359). The method may provide continuous transmission when a transmit path is temporarily unavailable and improve recovery time and/or latency when the transmit path becomes available again.

At block 1010, the method 1000 may include transmitting, from a UE, an uplink transmission using an uplink split bearer configuration from a PDCP entity over one or both of a first RLC entity associated with a MCG and a second RLC entity associated with a SCG, the configuration including a transmit buffer threshold. For example, the block 1010 may be performed by the PDCP component 1112. The PDCP component 1112 may receive uplink data from applications 1120. For example, the PDCP component 1112 may receive the uplink data via the SDAP layer. The PDCP component 1112 may generate uplink packets such as PDCP PDUs and route the PDCP PDUs to one or more RLC entities based on an uplink split bearer configuration and/or PDCP duplication. For example, with the split bearer configuration, the PDCP component 1112 may route the PDCP PDUs to the first RLC entity associated with the MCG, and optionally route the PDCP PDUs to the second RLC entity associated with the SCG (e.g., when the current buffer status level satisfies the transmit buffer threshold). If PDCP duplication is active, the PDCP component 1112 may route the PDCP PDUs to both the first RLC entity and the second RLC entity.

At block 1020, the method 1000 may include receiving, at the PDCP entity, an uplink switch start indication. The block 1020 may be performed by the switching component 1114. For example, the switching component 1114 may receive the switch start indication from another component that detects a condition that triggers an uplink path switch. For instance, a tune-away may be based on a configuration for a MAC layer or PHY layer. Accordingly, at sub-block 1022, the switching component 1114 may receive a tune-away start indication from the MAC layer or the PHY layer. As another example, at sub-block 1024, the switching component 1114 may receive an indication of low latency traffic from higher layers such as applications 1120 indicating low latency traffic (e.g., through use of a specific QoS flow). As another example, at sub-block 1026, the switching component 1114 may receive an indication of poor channel conditions generated by the RLC layer or the MAC layer.

At block 1030, the method 1000 may include activating the second RLC entity in response to receiving the uplink switch start indication. The block 1030 may be performed by the RLC control component 1116. For example, the RLC control component 1116 may designate the second RLC entity (e.g., RLC entity 425-b) as an active RLC entity. At sub-block 1032, the block 1030 may include forwarding packets to one or more RLC entities for the SCG. For example, PDCP duplication may allow multiple RLC entities for a cell group. The RLC control component 1116 may activate each of the RLC entities for the SCG and forward packets to each of the active RLC entities for the SCG.

At block 1040, the method 1000 may include transmitting a buffer status report according to a current transmit buffer level plus the transmit buffer threshold. For example, the block 1040 may be performed by the buffer component 1118. The buffer component 1118 may store RLC PDUs for one or more RLC entities prior to transmission. The buffer component 1118 may determine a current buffer level (e.g., the amount of data in the RLC PDUs). When in the switched mode, the buffer component 1118 may add the buffer transmit threshold to the current buffer level when generating the buffer status report. Accordingly, the buffer status report may indicate a greater level of data to transmit than stored in the buffer component 1118 in order to trigger an uplink grant for the SCG. In an implementation, at sub-block 1042, the buffer component 1118 may transmit the buffer status report from a media access control entity corresponding to the second RLC entity. For example, the buffer component 1118 may transmit the BSR 930 via the MAC entity 430-b.

At block 1050, the method 1000 may optionally include receiving, at the PDCP entity, an uplink switch stop indication. The block 1050 may be performed by the switching component 1114. For example, the uplink switch stop indication may correspond to the event that triggered the switch start indication. Accordingly, the switching component 1114 may receive a tune-away stop indication, an indication of an end of low latency traffic, or an indication of an end of poor channel conditions.

At block 1060, the method 1000 may optionally include deactivating the second RLC entity in response to receiving the uplink switch stop indication after expiration of a protection time period. The block 1060 may be performed by the RLC control component 1116. For example, the RLC control component 1116 may deactivate one or more RLC entities of the SCG stack 405-b. As discussed above, the protection time period 832 may allow time for the second RLC entity to request and receive a grant to transmit the remaining RLC PDUs stored in buffer component 1118.

Figure 11:
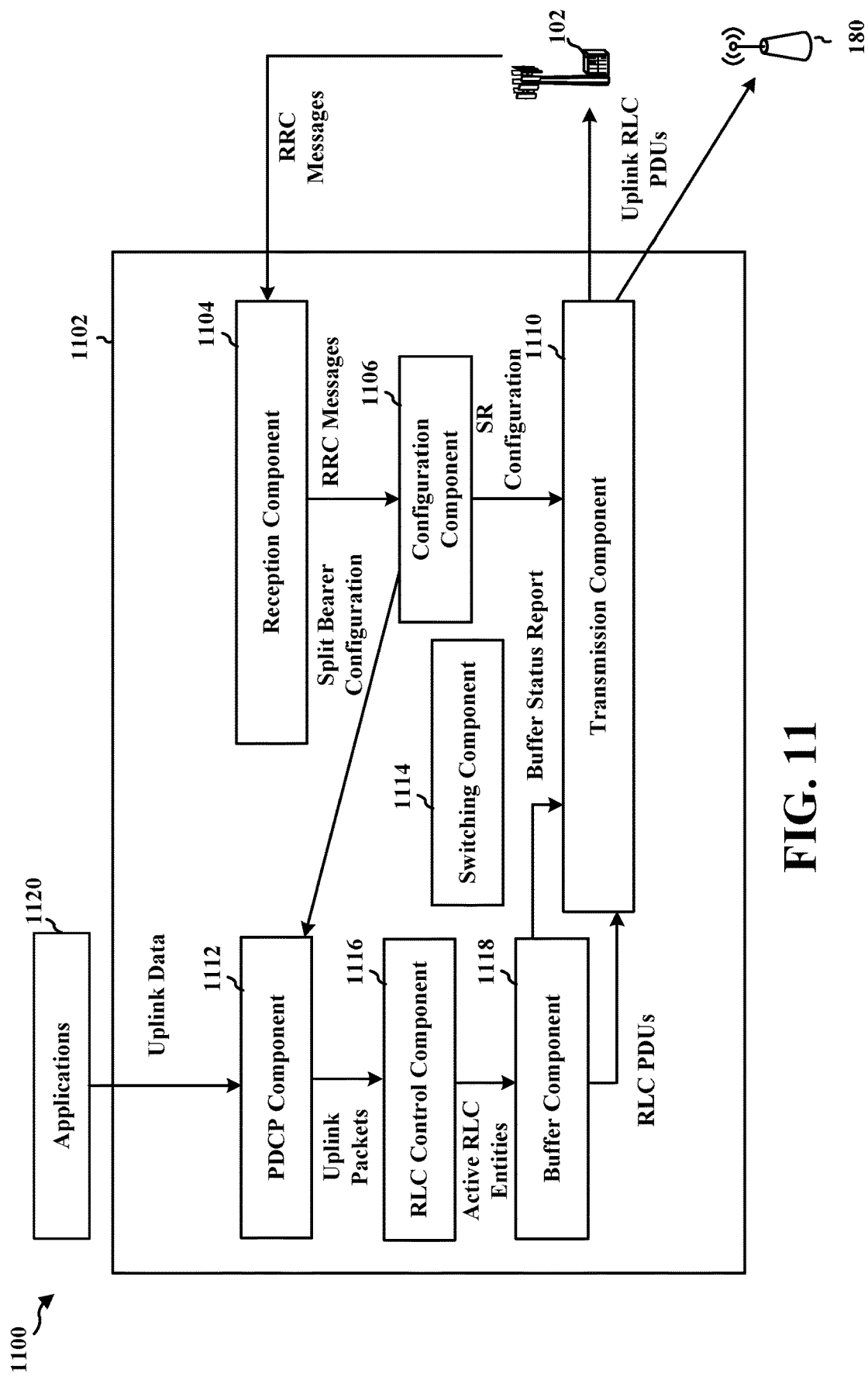
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE or a component of a UE. The apparatus 1102 includes a reception component 1104 that receives downlink signaling such as RRC messages from a base station such as base station 102 or base station 180. The apparatus 1102 includes a configuration component 1106 that receives the RRC messages from the reception component 1104 and extracts various configurations. For example, the configuration component 1106 may extract a split bearer configuration for configuring a PDCP component 1112 and a SR configuration for a PHY layer configuration of the transmission component 1110. The apparatus 1102 includes the transmission component 1110 that performs lower layer (e.g., MAC layer and PHY layer) processing for uplink transmissions. For example, the transmission component 1110 may transmit PHY layer signals carrying MAC transport blocks including the RLC PDUs to one or both of the base station 102 and the base station 180.

The apparatus 1102 includes a PDCP component 1112 that transmits an uplink transmission using an uplink split bearer configuration. That is the PDCP component 1112 may perform PDCP layer processing including routing PDCP PDUs to one of both of a first RLC entity associated with a MCG and a second RLC entity associated with an SCG, e.g., as described in connection with block 1010. The apparatus 1102 includes a switching component 1114 that receives a switch start indication, e.g., as described in connection with block 1020. The switching component 1114 may also receive a switch stop indication, e.g., as described in connection with block 1050. The apparatus 1102 includes an RLC control component 1116 that activates the second RLC entity in response to receiving the uplink switch start indication, e.g., as described in connection with block 1030. The RLC control component 1116 may also deactivate the second RLC entity in response to receiving a switch stop indication, e.g., as described in connection with block 1060. In an aspect, the PDCP component 1112, the switching component 1114, and the RLC control component 1116 may be components of the PDCP entity 420.

The apparatus 1102 includes a buffer component 1118 that transmits a buffer status report according to a current transmit buffer level plus the transmit buffer threshold, e.g., as described in connection with block 1040. In an aspect, the buffer component 1118 may be a component of an RLC entity (e.g., RLC entity 425-*b*). The buffer component 1118 may transmit the buffer status report via an associated MAC entity (e.g., MAC entity 430-*b*), which may be implemented by the transmission component 1110.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
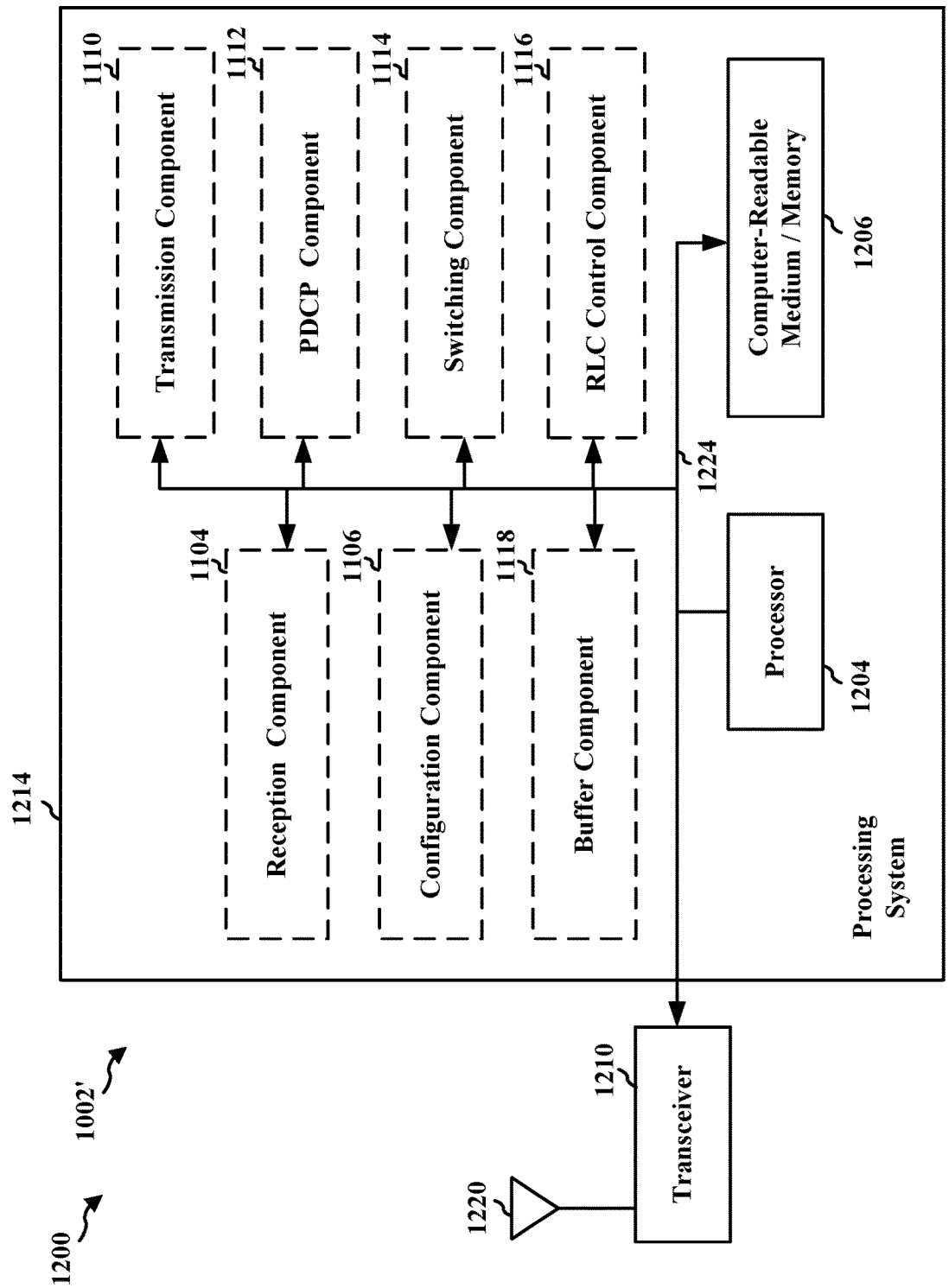
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1110, 1112, 1114, 1116, 1118, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1110, 1112, 1114, 1116, 1118. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see UE 350 of FIG. 3).

In one configuration, the apparatus 1102/1102' for wireless communication includes means for means for transmitting, from a user equipment, an uplink transmission using an uplink split bearer configuration from a packet data convergence protocol (PDCP) layer over one or both of a first radio link control (RLC) entity associated with a master cell group (MCG) and a second RLC entity associated with a secondary cell group (SCG), the configuration including a transmit buffer threshold; means for receiving, at the PDCP entity, an uplink switch start indication; means for activating the second RLC entity in response to receiving the uplink switch start indication; and means for transmitting a buffer status report according to a current transmit buffer level plus the transmit buffer threshold.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In view of the foregoing, uplink path switching provides continuous transmission from a UE in the event that a transmission path for the MCG becomes temporarily unavailable. Further, by switching the uplink transmit path to the SCG the transmit path for the MCG may recover more quickly without needing to clear overdue uplink data packets. Additionally, a switch stop indication may be used to restore the transmission path for the MCG and provide a protection time period to clear uplink data packets from the transmission path for the SCG. In an implementation where the MCG is associated with LTE and the SCG is associated with 5G NR, uplink path switching may improve latency when an indication of low latency traffic triggers the uplink switch start indication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   transmitting, from a user equipment (UE), an uplink transmission using an uplink split bearer configuration from a packet data convergence protocol (PDCP) entity over one or both of a first radio link control (RLC) entity associated with a master cell group (MCG) and a second RLC entity associated with a secondary cell group (SCG), the uplink split bearer configuration including a transmit buffer threshold;
   receiving, at the PDCP entity, an uplink switch start indication;
   activating the second RLC entity in response to receiving the uplink switch start indication; and
   transmitting a buffer status report based on a sum of a current transmit buffer level and the transmit buffer threshold.

2. The method of claim 1, further comprising:
   receiving, at the PDCP entity, an uplink switch stop indication; and
   deactivating the second RLC entity in response to receiving the uplink switch stop indication after expiration of a protection time period.

3. The method of claim 2, wherein the protection time period is based on a scheduling request configuration.

4. The method of claim 1, wherein activating the second RLC entity comprises forwarding packets to one or more RLC entities for the SCG.

5. The method of claim 1, wherein transmitting the buffer status report comprises transmitting the buffer status report from a media access control entity corresponding to the second RLC entity.

6. The method of claim 1, wherein the MCG is associated with a first radio access technology (RAT) and the SCG is associated with a second RAT.

7. The method of claim 1, wherein receiving, at the PDCP entity, the uplink switch start indication comprises receiving a tune-away start indication.

8. The method of claim 7, wherein the tune-away start indication is associated with a periodic tune-away in a multiple subscriber identification module (SIM) device.

9. The method of claim 1, wherein receiving, at the PDCP entity, the uplink switch start indication comprises receiving an indication of low latency traffic.

10. The method of claim 1, wherein receiving, at the PDCP entity, the uplink switch start indication comprises receiving an indication of poor channel conditions.

11. An apparatus for wireless communication, comprising:
    means for transmitting, from a user equipment, an uplink transmission using an uplink split bearer configuration from a packet data convergence protocol (PDCP) entity over one or both of a first radio link control (RLC) entity associated with a master cell group (MCG) and a second RLC entity associated with a secondary cell group (SCG), the uplink split bearer configuration including a transmit buffer threshold;
    means for receiving, at the PDCP entity, an uplink switch start indication;
    means for activating the second RLC entity in response to receiving the uplink switch start indication; and
    means for transmitting a buffer status report based on a sum of a current transmit buffer level and the transmit buffer threshold.

12. The apparatus of claim 11, wherein the means for receiving the uplink switch start indication is further configured to receive, at the PDCP entity, an uplink switch stop indication; and wherein the means for activating the second RLC entity is configured to deactivate the second RLC entity in response to receiving the uplink switch stop indication after expiration of a protection time period.

13. The apparatus of claim 12, wherein the protection time period is based on a scheduling request configuration.

14. The apparatus of claim 11, wherein the means for activating the second RLC entity is configured to forward packets to one or more RLC entities for the SCG.

15. The apparatus of claim 11, wherein the means for transmitting the buffer status report is configured to transmit the buffer status report from a media access control entity corresponding to the second RLC entity.

16. The apparatus of claim 11, wherein the MCG is associated with a first radio access technology (RAT) and the SCG is associated with a second RAT.

17. The apparatus of claim 11, wherein the means for receiving, at the PDCP entity, the uplink switch start indication is configured to receive a tune-away start indication.

18. The apparatus of claim 17, wherein the tune-away start indication is associated with a periodic tune-away in a multiple subscriber identification module (SIM) device.

19. The apparatus of claim 11, wherein the means for receiving, at the PDCP entity, the uplink switch start indication is configured to receive an indication of low latency traffic.

20. The apparatus of claim 11, wherein the means for receiving, at the PDCP entity, the uplink switch start indication is configured to receive an indication of poor channel conditions.

21. An apparatus for wireless communication, comprising:
- a memory; and
- at least one processor coupled to the memory and configured to:
- transmit, from a user equipment, an uplink transmission using an uplink split bearer configuration from a packet data convergence protocol (PDCP) entity over one or both of a first radio link control (RLC) entity associated with a master cell group (MCG) and a second RLC entity associated with a secondary cell group (SCG), the uplink split bearer configuration including a transmit buffer threshold;
- receive, at the PDCP entity, an uplink switch start indication;
- activate the second RLC entity in response to receiving the uplink switch start indication; and
- transmit a buffer status report based on a sum of a current transmit buffer level and the transmit buffer threshold.

22. The apparatus of claim 21, wherein the at least one processor is configured to:
- receive, at the PDCP entity, an uplink switch stop indication; and
- deactivate the second RLC entity in response to receiving the uplink switch stop indication after expiration of a protection time period.

23. The apparatus of claim 22, wherein the protection time period is based on a scheduling request configuration.

24. The apparatus of claim 21, wherein the at least one processor is configured to forward packets to one or more RLC entities for the SCG when the second RLC entity is active.

25. The apparatus of claim 21, wherein the at least one processor is configured to transmit the buffer status report from a media access control entity corresponding to the second RLC entity.

26. The apparatus of claim 21, wherein the MCG is associated with a first radio access technology (RAT) and the SCG is associated with a second RAT.

27. The apparatus of claim 21, wherein the at least one processor is configured to receive a tune-away start indication as the uplink switch start indication.

28. The apparatus of claim 27, wherein the tune-away start indication is associated with a periodic tune-away in a multiple subscriber identification module (SIM) device.

29. The apparatus of claim 21, wherein the at least one processor is configured to receive an indication of low latency traffic or an indication of poor channel conditions as the uplink switch start indication.

30. A non-transitory computer-readable medium storing computer executable code, the code when executed by a processor cause the processor to:
- transmit, from a user equipment, an uplink transmission using an uplink split bearer configuration from a packet data convergence protocol (PDCP) entity over one or both of a first radio link control (RLC) entity associated with a master cell group (MCG) and a second RLC entity associated with a secondary cell group (SCG), the uplink split bearer configuration including a transmit buffer threshold;
- receive, at the PDCP entity, an uplink switch start indication;
- activate the second RLC entity in response to receiving the uplink switch start indication; and
- transmit a buffer status report according to a sum of a current transmit buffer level and the transmit buffer threshold.

* * * * *